Jan. 22, 1963  W. M. HANLEY  3,074,557
STRAINER
Filed Feb. 9, 1959
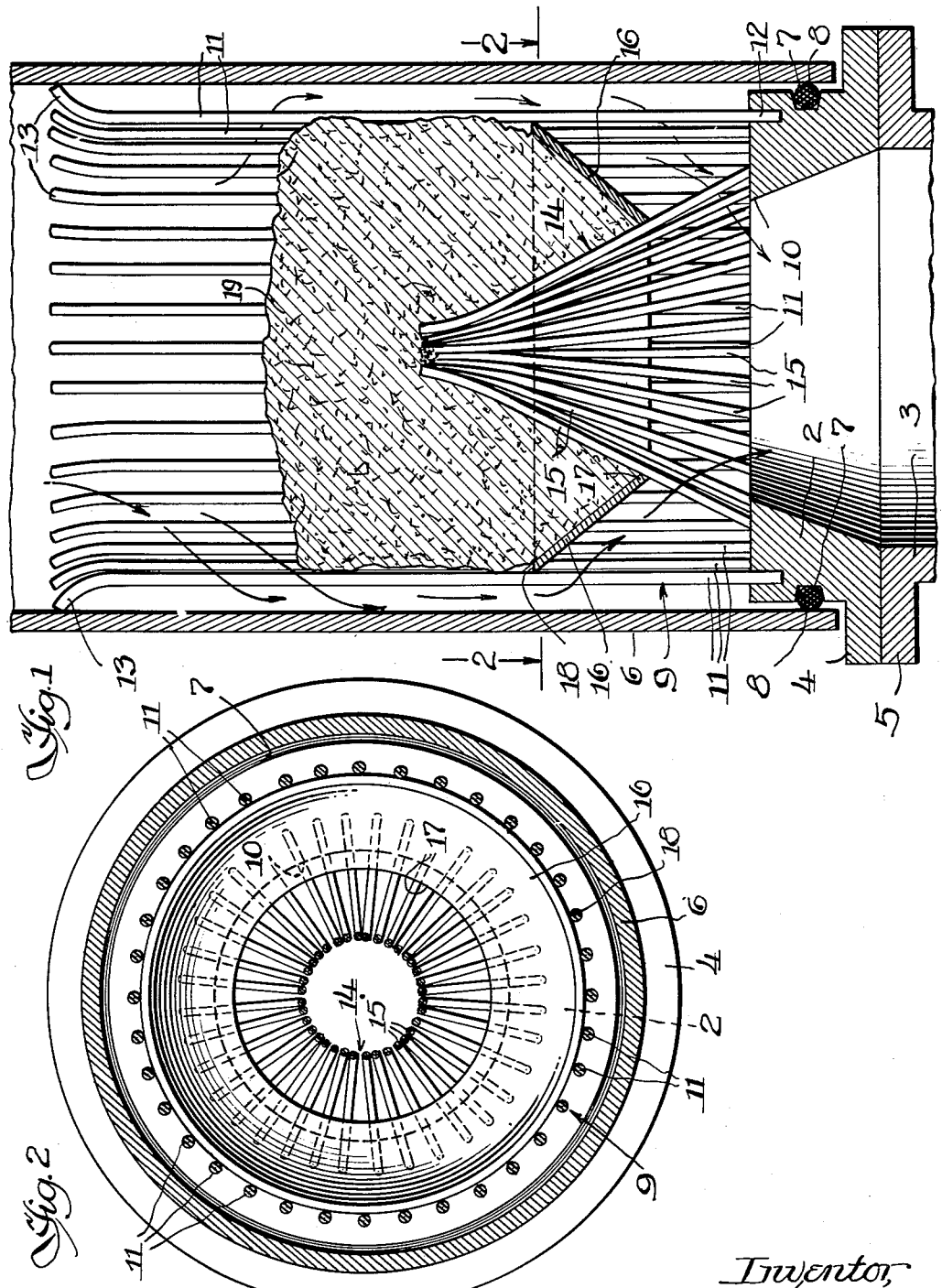

United States Patent Office 3,074,557
Patented Jan. 22, 1963

3,074,557
STRAINER
William M. Hanley, Chicago, Ill., assignor to FMC Corporation, a corporation of Delaware
Filed Feb. 9, 1959, Ser. No. 792,144
5 Claims. (Cl. 210—299)

This invention relates to a strainer adapted for use in connection with the sewage inflow to a wet well, and is particularly concerned with means for preventing such strainers from being clogged.

Although the strainer may be used in many different fields, it is specifically designed for sewage inflow into a wet well from which the sewage liquid is pumped when the liquid level attains a predetermined height, and will be described in connection with said use.

In sewage systems provided with a wet well for the accumulation of liquid it is customary to use one or more conduit sections as part of the inlet conduit and also as part of the discharge conduit. The flow of liquid in this section of the conduit is reversible, the pump being idle during the inflow cycle, and the rest of the inlet conduit being closed by a valve during the discharge cycle. During the inflow cycle the sewage liquid carries with it various solids, such as, for example, rags, toilet paper, paper diapers, paper towels, paper napkins, etc.

A strainer is secured in one of the common conduit sections to intercept the solids so that they can not be carried into the wet well during the inflow cycle. The liquid, from which the solids have been strained, flows through the strainer and into the wet well. The solids tend to clog the strainer and thereby impair or block the flow of liquid into the wet well. This problem has become acute with the advent of high wet strength paper which does not disintegrate readily even when wet.

In accordance with the present invention, the strainer is so positioned in the conduit that all the liquids flowing through the conduit must pass through the strainer before they can flow into the wet well. The strainer is designed to retain the solids in spaced relationship to the inner wall surface of the conduit, so that the liquid can by-pass the intercepted solids by flowing through the space provided between the casing of the strainer and the inner wall surface of the conduit. The liquid flowing through said space passes through the strainer so that its solids are intercepted before the liquid enters said space.

The conduit is provided with an internal annular shoulder upon which the strainer is mounted, and the liquid passing through the strainer flows through the opening defined by the shoulder into the wet well, or into another conduit section that leads to the wet well. The solids which are retained in the strainer are allowed to accumulate as long as the inflow cycle continues. The strainer is designed to hold all the solids that accumulate during the inflow without allowing them to extend beyond the portion of the retaining wall which is spaced from the inner wall surface of the conduit. The bottom of the retaining member is spaced above the shoulder to provide a passageway for the liquid to flow through the conduit under the intercepted solids.

When the liquid level in the wet well reaches a predetermined level, the pump starts operating and reverses the flow of liquid through the conduit sections which serve for discharge as well as inflow of sewage. A check valve closes the portion of the conduit used exclusively for inflow, and directs the discharge toward the outlet. As the liquid is pumped through the strainer it carries all the solids accumulated therein, along with the liquid discharge, to the outlet. The pump is set to start operating at a level low enough so that the strainer never gets completely filled with the intercepted solids. If the intercepted solids come too close to filling the strainer before the pump starts, the condition may be corrected by inserting a strainer of larger capacity or by adjusting the level of pump operation so that the pump starts to operate at a lower liquid level.

The structure by means of which the above-mentioned and other advantages are attained will be described in the following specification, taken in conjunction with the accompanying drawing, showing a preferred illustrative embodiment of the invention, in which:

FIGURE 1 is a front view, partly in section and partly in elevation, showing one embodiment of the invention; and FIG. 2 is a cross sectional view, taken along the line 2—2 of FIG. 1.

Referring to the drawing, the reference numeral 2 indicates an annular base section rigidly secured in any suitable manner to a conduit section 3. Sections 2 and 3 are provided with lateral flanges 4 and 5, respectively. Flanges 4 and 5 abut each other and may be bolted together with any suitable sealing material therebetween to form a liquid tight joint. Another conduit section 6 is seated on flange 4, and a compressible ring 7 is interposed between the outer surface of base section 2 and the inner wall surface of conduit section 6 to form a liquid tight seal. Preferably ring 7 is positioned in a peripheral notch 8 to prevent accidental displacement thereof.

The relative circumferential dimensions of conduit sections 3 and 6 are not critical, but base section 2 preferably extends inwardly of the inner wall surface of conduit section 6 far enough to permit one end of a casing 9 to be secured thereto in spaced relationship to said inner wall surface. Generally the opening 10 in base section 2 is of reduced diameter compared to the inner diameter of conduit section 6. Base section 2 may be omitted if conduit section 6 is provided with a flange to replace flange 4. An internal annular shoulder may be integral with either conduit section 3 or 6, or may be formed as a separate member. The strainer is preferably supported on the shoulder.

In the embodiment illustrated, casing 9 comprises a group of rods 11 uniformly spaced inwardly of the inner wall surface of conduit section 6, and also uniformly spaced circumferentially of said conduit section. The circumferential spacing of rods 11 is sufficiently close to prevent solids larger than a predetermined minimum from passing between them.

Each rod 11 has its lower end embedded in base section 2, as indicated at 12, and its upper end bent outwardly, as indicated at 13, to engage the inner surface of conduit section 6. The engagement of the upper ends of rods 11 with the inner surface of conduit section 6 prevents any solids too large to pass between the rods from getting into the space between the outer periphery of casing 9 and the inner wall surface of conduit section 6. Accumulation of solids in this space would build up an effective barrier to impair, and eventually block the flow of liquid through the conduit.

The strainer also includes a cone 14 which comprises a group of rods 15 sloping in conical formation. The lower ends of rods 15 circumscribe opening 10 and preferably are embedded in base section 2 although they may be secured to the shoulder of base section 2 in any suitable manner. The circumferential spacing of rods 15 adjacent base section 2 is approximately the same as the circumferential spacing between rods 11. The apex of cone 14 extends within casing 9.

The strainer has means providing an interengaging relationship between rods 11 and 15 to prevent solids which flow with the liquid into the interior of casing 9 from passing through opening 10. In the embodiment of the invention illustrated, this means comprises an annular shield 16 which has a lower edge engaging the outer surface of cone 14, as indicated at 17, and an upper edge engaging the inner surface of casing 9, as indicated at 18. Shield 16 may be imperforate, or may have a plurality of apertures to permit liquid to flow therethrough. The apertures, if provided, must be small enough to prevent passage of solids larger than the prescribed minimum. It will be understood that shield 16 exemplifies one means for cooperating with cone 14 to intercept solids and retain them within a portion of casing 9 intermediate the ends of said casing. The same result may be attained by other means.

The operation of the strainer will now be described. The liquid to be strained flows through conduit section 6 and through opening 10 into conduit section 3. If the liquid is free of solids it may flow freely between rods 11 and between rods 15. If shield 16 is imperforate, the liquid impinging thereon will flow downwardly to its lower edge and then between rods 15. Solids larger than the prescribed minimum cannot pass between rods 11 or rods 15 and therefore will be trapped within casing 9. The solids move downwardly until they reach shield 16 and will gravitate toward the lower edge of the shield, which is located above the lower end of casing 9.

As long as the flow of liquid continues in the same direction, the solids gradually accumulate up within the casing between the outer surface of cone 14 and the inner surface of shield 16. When the intercepted solids retained within casing 9, indicated at 19, attain a level above the upper end of cone 14, they form a barrier effectively preventing any liquid from flowing through the interior of casing 9. The liquid flowing through the conduit then by-passes the solids and flows around them through the space between the inner wall surface of the conduit and the outer surface of the casing, as indicated by the arrows in FIG. 1. This by-passing of the solids is made possible by retaining the bottom of the intercepted solids above the bottom of casing 9.

Rods 11 have sufficient length to prevent the solids from building up to the upper edge of casing 9 before the pump associated with the conduit starts to operate and the direction of the flow of liquid is reversed. If the solids are allowed to accumulate until they reach the upper end of casing 9 they will completely block out the entire interior of conduit section 6 and prevent any liquid flow therethrough.

When the direction of the liquid flow is reversed, the liquid discharged from the pump flushes the solids out of casing 9 and carries them through the discharge outlet. The flushing action of the liquid flowing through the conduit in the reverse direction, which is relied upon to keep the strainer clean, is enhanced by the location of the casing of the strainer relative to the axial center of the conduit. The casing is positioned in spaced relationship to the inner surface of the conduit wall, and therefore the solids intercepted by the strainer are held away from the conduit walls. The velocity of liquids flowing through a conduit varies across the cross section of the conduit, being appreciably slower near the wall of the conduit than at the center thereof. By positioning the casing to hold the solids in the path of liquid having the greatest velocity, a more vigorous flushing action is attained, thereby insuring removal of all the intercepted solids from the strainer during each pumping cycle. When the pump stops, the direction of the liquid flow is again reversed, and the operational cycle is repeated.

Although I have described a preferred embodiment of the invention in considerable detail, it will be understood that the description is intended to be illustrative, rather than restrictive, as many details may be modified or changed, without departing from the spirit or scope of the invention. Accordingly, I do not desire to be restricted to the exact construction described.

I claim:

1. In combination with a conduit having an opening at one end through which liquid is adapted to flow, a strainer secured in said conduit in such position that all liquid flowing through said conduit must pass through said strainer to reach said opening, said strainer including a group of rods mounted in said conduit with one end of each rod cooperating with the inner wall surface of said conduit to prevent solids from entering the space between said rods and said inner wall surface of said conduit and the major portion of the length of each rod being parallel to the longitudinal axis of said conduit thereby forming a casing spaced inwardly from the inner surface of said conduit, and a second group of rods forming a cone extending within said casing, said casing and said cone each having one end circumscribing said opening, the rods of each of said groups being spaced in sufficiently close relationship to the other rods of its group to intercept solids carried by liquids flowing through said strainer, and means engaging said casing and cone for holding the intercepted solids spaced from said opening to prevent clogging of said strainer adjacent said opening, whereby liquid flowing through said conduit may by-pass said solids.

2. In combination with a conduit having an opening at one end through which liquid is adapted to flow, a strainer secured in said conduit in such position that all liquid flowing through said conduit must pass through said strainer to reach said opening, said strainer including a plurality of rods mounted in said conduit with one end of each rod engaging the inner wall surface of said conduit to prevent solids from entering the space between said rods and said inner wall surface of said conduit and the major portion of the length of each rod being parallel to the longitudinal axis of said conduit thereby forming a casing spaced from the inner surface of said conduit, and a cone extending within said casing, said casing and said cone each having one end circumscribing said opening, the rods of said casing and the rods of said cone being spaced to intercept solid matter carried by liquids flowing through said strainer, and an annular shield having an outer edge engaging said casing and an inner edge engaging said cone for holding the intercepted solids within said casing and intermediate its ends, whereby liquid flowing through said conduit may by-pass the intercepted solids.

3. In combination with a conduit having an internal annular shoulder, a strainer including a casing positioned within said conduit, said casing comprising a plurality of rods each secured at one end to said shoulder and extending axially of said conduit in uniformly spaced relationship to the inner wall surface of said conduit, said rods being arranged circumferentially of said conduit and spaced sufficiently close to each other to intercept solids carried by liquids flowing through said conduit, the opposite end of each rod extending outwardly into engagement with the inner wall surface of said conduit to prevent passage of said solids into the space between said casing and the inner wall surface of said conduit, a cone extending into said casing, said cone comprising a plurality of rods supported on said shoulder, the rods of said cone being spaced sufficiently close to each other to prevent solids from flowing past said shoulder, and means cooperating with said casing and said cone to retain intercepted solids in spaced relationship to said shoulder, whereby liquids flowing through said conduit may pass through the space between said casing and the inner wall surface of said conduit and then between the rods of said casing and said cone below the intercepted solids to continue their flow through said conduit.

4. In combination with a conduit having an internal annular shoulder defining an opening coaxial with said conduit, a strainer secured in said conduit so that all liquid flowing through said conduit must pass through said strainer and solids carried by said liquid are intercepted thereby, said strainer including a foraminated wall portion mounted in and extending axially from said annular shoulder and spaced from and generally parallel to the inner wall surface of said conduit to provide an annular chamber therebetween, means on the end of said wall portion remote from said shoulder cooperating with said inner wall to prevent solids from entering said annular chamber, foraminated means extending interiorly and axially of said wall portion to a region spaced axially from said shoulder to intercept solids carried by the liquid and permit the flow of liquid therethrough, and shield means extending between and engaging said wall portion and said foraminated means at points spaced axially from said shoulder for holding the intercepted solids interiorly of said wall portion whereby said wall portion, said foraminated means and said shield means cooperate to confine the intercepted solids in a region between said wall portion and said foraminated means which is intermediate the length of said strainer so that liquid flowing through said conduit may flow through said annular chamber to by-pass said intercepted solids.

5. The combination defined in claim 4 in which said foraminated wall portion comprises a group of generally parallel rods mounted in said annular shoulder with the ends of said parallel rods remote from said shoulder engaging the inner wall surface of said conduit and said foraminated means comprise a second group of rods mounted in said annular chamber and forming a cone extending interiorly of said parallel rods.

References Cited in the file of this patent
UNITED STATES PATENTS

| | | |
|---|---|---|
| 1,768,643 | Summers | July 1, 1930 |
| 2,068,858 | Jones | Jan. 26, 1937 |
| 2,278,178 | Lannert | Mar. 31, 1942 |
| 2,658,625 | Rafferty | Nov. 10, 1953 |

FOREIGN PATENTS

| | | |
|---|---|---|
| 1,911 | France | June 23, 1826 |
| 20,584 | Great Britain | Sept. 17, 1906 |
| 126,586 | Great Britain | May 15, 1919 |